US012684493B2

(12) United States Patent
Ladhagiri Krishnakumar et al.

(10) Patent No.: US 12,684,493 B2
(45) Date of Patent: Jul. 14, 2026

(54) OPTIMIZED HANDLING FOR TRANSMIT POWER BACKOFFS TO ENABLE UPLINK TRANSMIT POWER BOOST

(71) Applicant: QUALCOMM Incorporated, San Diego, CA (US)

(72) Inventors: Sai Lokesh Ladhagiri Krishnakumar, Hyderabad (IN); Swarupa Gandhi Vudata, Hyderabad (IN); Akash Kumar, Hyderabad (IN); Sumitkumar Shrikant Dubey, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 18/325,767

(22) Filed: May 30, 2023

(65) Prior Publication Data

US 2024/0406878 A1      Dec. 5, 2024

(51) Int. Cl.
*H04W 52/14*          (2009.01)
*H04W 52/34*          (2009.01)

(52) U.S. Cl.
CPC ....... *H04W 52/146* (2013.01); *H04W 52/346* (2013.01)

(58) Field of Classification Search
CPC ............. H04W 52/146; H04W 52/346; H04W 52/367; H04W 52/42
See application file for complete search history.

(56) References Cited

U.S. PATENT DOCUMENTS

| | | |
|---|---|---|
| 2013/0039173 A1 | 2/2013 | Ehsan et al. |
| 2014/0254639 A1 | 9/2014 | Tahir et al. |
| 2017/0223641 A1* | 8/2017 | Haim .................. H04W 52/365 |
| 2018/0098291 A1 | 4/2018 | Fodor et al. |
| 2019/0068429 A1* | 2/2019 | Sagi ..................... H04B 1/0483 |
| 2019/0098597 A1* | 3/2019 | Basu Mallick ......... H04W 8/06 |
| 2020/0112349 A1* | 4/2020 | Yang ................... H04B 7/0404 |
| 2021/0297959 A1 | 9/2021 | Zhou et al. |
| 2022/0232367 A1 | 7/2022 | Gopal et al. |

* cited by examiner

*Primary Examiner* — John J Lee
(74) *Attorney, Agent, or Firm* — Harrity & Harrity LLP

(57)          ABSTRACT

Various aspects of the present disclosure generally relate to wireless communication. In some aspects, a user equipment (UE) may apply a per chain transmit power split to a cumulative maximum transmit power level (MTPL). The UE may calculate a value associated with a conditional power backoff, wherein the value associated with the conditional power backoff is calculated after the per chain transmit power split is applied to the cumulative MTPL. The UE may transmit, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff. Numerous other aspects are described.

30 Claims, 6 Drawing Sheets

500 ⟶

510 — Apply a per chain transmit power split to a cumulative maximum transmit power level (MTPL)

520 — Calculate a value associated with a conditional power backoff, wherein the value associated with the conditional power backoff is calculated after the per chain transmit power split is applied to the cumulative MTPL 530 — Transmit, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff

400

410

Per chain Tx power split applied after all backoff metrics are applied

| Tx power parameter | Value | Tx Power |
|---|---|---|
| MTPL | +26 dB | 26 dB |
| MPR / A-MPR | -1.5 dB | 24.5 dB |
| Delta power class backoff | -1.5 dB | 23 dB |
| Per chain Tx power split | -3 dB | 20 dB |
| Final Tx power | | 20 dB |

420

Per chain Tx power split applied before conditional backoff metric(s)

| Tx power parameter | Value | Tx Power |
|---|---|---|
| MTPL | +26 dB | 26 dB |
| MPR / A-MPR | -1.5 dB | 24.5 dB |
| Per chain Tx power split | -3 dB | 21.5 dB |
| Delta power class backoff | 0 dB | 21.5 dB |
| Final Tx power | | 21.5 dB |

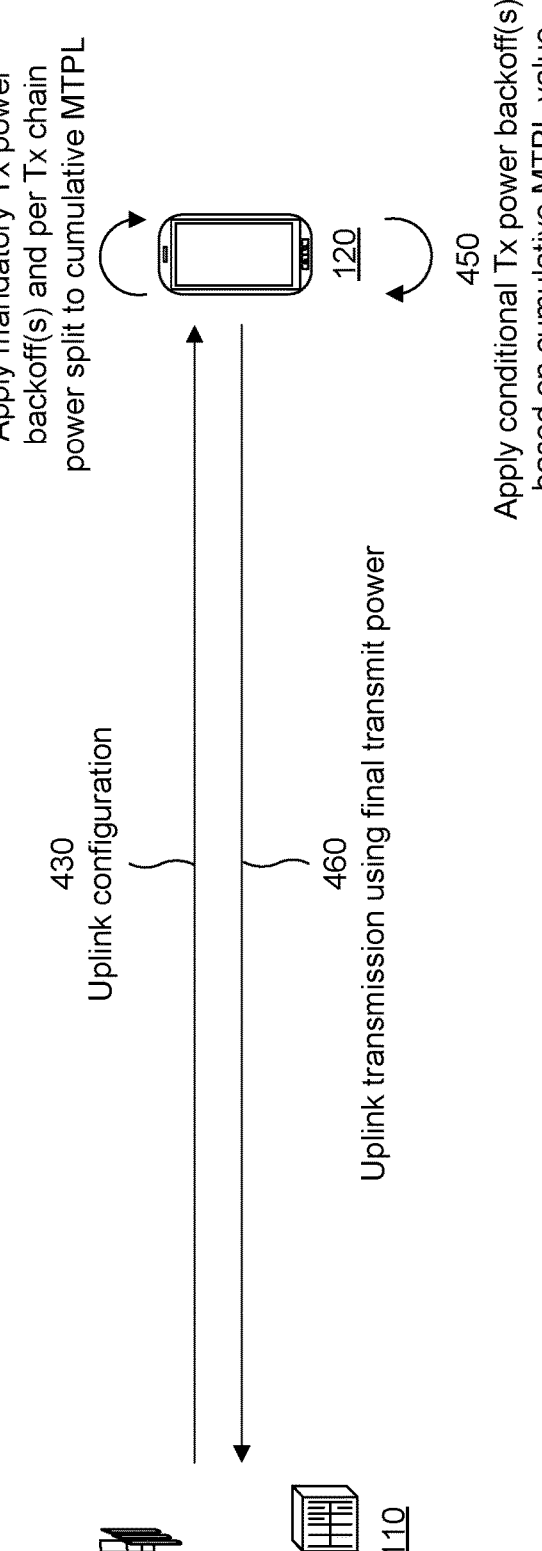

430
Uplink configuration

440
Apply mandatory Tx power backoff(s) and per Tx chain power split to cumulative MTPL 450
Apply conditional Tx power backoff(s) based on cumulative MTPL value 460
Uplink transmission using final transmit power

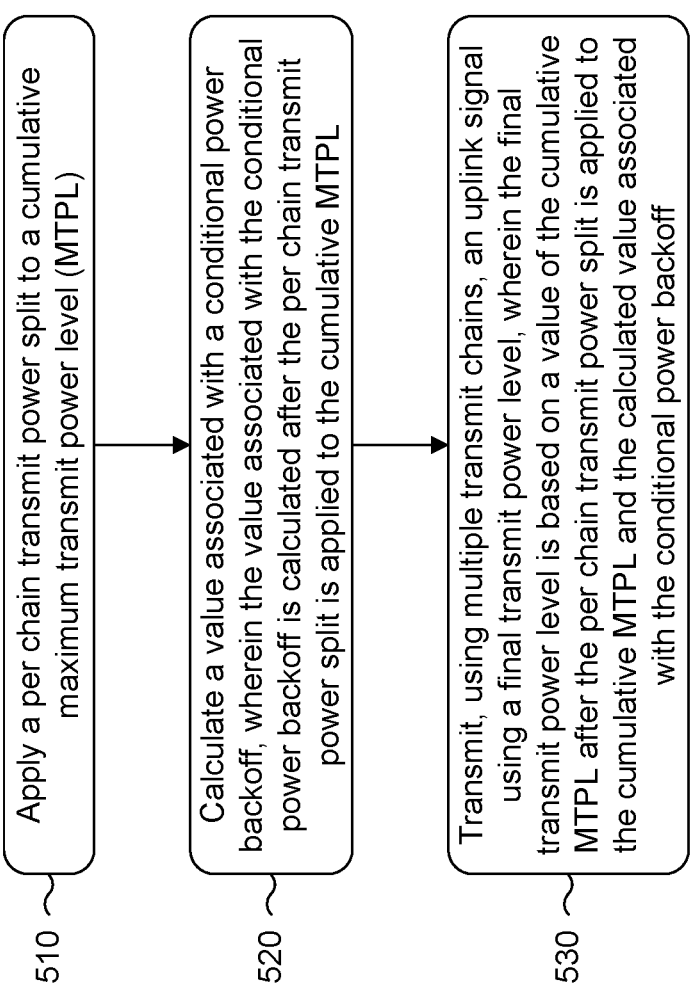

510 — Apply a per chain transmit power split to a cumulative maximum transmit power level (MTPL)

520 — Calculate a value associated with a conditional power backoff, wherein the value associated with the conditional power backoff is calculated after the per chain transmit power split is applied to the cumulative MTPL 530 — Transmit, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff

OPTIMIZED HANDLING FOR TRANSMIT POWER BACKOFFS TO ENABLE UPLINK TRANSMIT POWER BOOST

FIELD OF THE DISCLOSURE

Aspects of the present disclosure generally relate to wireless communication and to techniques and apparatuses associated with optimized handling for transmit power backoffs to enable uplink transmit power boost.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example associated with optimized handling for transmit power backoffs to enable uplink transmit power boost, in accordance with the present disclosure.

FIG. 5 is a diagram illustrating an example process associated with optimized handling for transmit power backoffs to enable uplink transmit power boost, in accordance with the present disclosure.

SUMMARY

Figure 1:
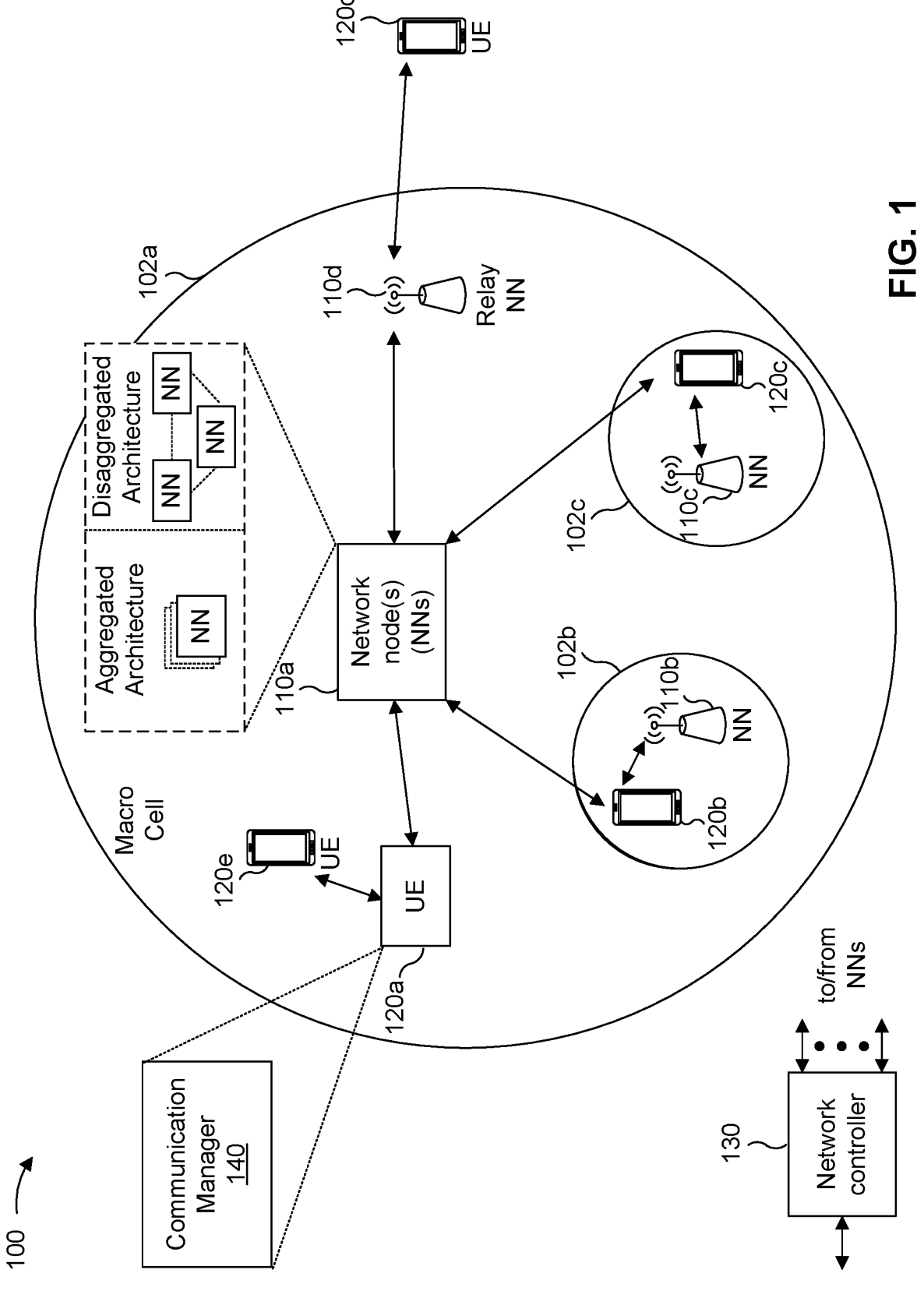
FIG. 1 is a diagram illustrating an example of a wireless network, in accordance with the present disclosure.

Some aspects described herein relate to a method of wireless communication performed by a user equipment (UE). The method may include applying a per chain transmit power split to a cumulative maximum transmit power level (MTPL). The method may include calculating a value associated with a conditional power backoff, wherein the value associated with the conditional power backoff is calculated after the per chain transmit power split is applied to the cumulative MTPL. The method may include transmitting, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff.

Some aspects described herein relate to a UE for wireless communication. The UE may include one or more memories and one or more processors coupled to the one or more memories. The one or more processors may be configured to apply a per chain transmit power split to a cumulative MTPL. The one or more processors may be configured to calculate a value associated with a conditional power backoff, wherein the value associated with the conditional power backoff is calculated after the per chain transmit power split is applied to the cumulative MTPL. The one or more processors may be configured to transmit, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff.

Some aspects described herein relate to a non-transitory computer-readable medium that stores a set of instructions for wireless communication by a UE. The set of instructions, when executed by one or more processors of the UE, may cause the UE to apply a per chain transmit power split to a cumulative MTPL. The set of instructions, when executed by one or more processors of the UE, may cause the UE to calculate a value associated with a conditional power backoff, wherein the value associated with the conditional power backoff is calculated after the per chain transmit power split is applied to the cumulative MTPL. The set of instructions, when executed by one or more processors of the UE, may cause the UE to transmit, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff.

Some aspects described herein relate to an apparatus for wireless communication. The apparatus may include means for applying a per chain transmit power split to a cumulative MTPL. The apparatus may include means for calculating a value associated with a conditional power backoff, wherein the value associated with the conditional power backoff is calculated after the per chain transmit power split is applied to the cumulative MTPL. The apparatus may include means for transmitting, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

In a wireless network, a link budget between a user equipment (UE) and a network node is typically limited by an uplink due to a relatively low transmit power by a UE, which defines a limit on a cell range. For example, when a UE transmits using a high transmit power, the UE can communicate with a network node from a longer distance. Similarly, when a UE transmits using a relatively lower transmit power, a cell radius associated with the network node may decrease. Accordingly, in some cases, a UE may be associated with a UE power class that defines a maximum transmit power level (MTPL) that a UE can use over a channel bandwidth. For example, in frequency range 1 (FR1), a UE may be associated with power class 3 (PC3), which is applicable to all FR1 frequency bands and specifies an MTPL of 23 decibel-milliwatts (dBm), or with power class 2 (PC2), which applies to specific operating bands (e.g., n41, n77, n78, or n79) and specifies a higher MTPL of 26 dBm. Additionally, or alternatively, there are four UE power classes defined for frequency range 2 (FR2), with each UE power class being associated with an intended use case or application. For example, in FR2, power class 1 (PC1) specifies an MTPL of 35 dBm for fixed wireless access (FWA) UEs that are used to provide broadband access in residential or office settings, and power classes 2 through 4 (PC2) specify an MTPL of 23 dBm for vehicular UEs, handheld UEs, and/or high-power non-handheld UEs. Furthermore, in FR2, the different power classes may be associated with different effective isotropic radiated power (EIRP) parameters, including maximum EIRP values to satisfy regulatory requirements (e.g., ensuring that devices do not transmit with high power that could cause health issues or generate excessive interference) and minimum peak EIRP values to ensure that UE transmissions generate a minimum output power in a given direction.

Accordingly, in some aspects, a UE may be associated with a power class based on one or more capabilities or attributes of the UE, such as a maximum transmit power to be used by the UE for one or more uplink transmissions. Example power classes include PC1 for a high power UE with an MTPL of 35 dBm, PC2 for a UE with an MTPL of 26 dBm, PC3 for a UE with an MTPL of 23 dBm, or the like. In some cases, the UE may have a fixed power class that does not change, and the UE may indicate (e.g., report) the fixed power class to a network node every time that the UE registers with a wireless network. Additionally, or alternatively, conditions associated with the UE may change over time, whereby the UE may use different power classes in different circumstances depending on the varying conditions. Furthermore, in various circumstances, the UE may be subject to one or more transmit power backoff metrics that reduce the cumulative MTPL that a UE can use when transmitting an uplink signal. For example, the UE may be subject to one or more mandatory transmit backoff metrics, such as a maximum power reduction (MPR) that may depend on a resource block (RB) allocation or an MCS associated with the UE (e.g., to prevent interference with other UEs) and/or an additional MPR (A-MPR) (e.g., to satisfy maximum permissible exposure (MPE) constraints, other regulatory requirements related to a maximum EIRP, or the like). Additionally, or alternatively, the UE may be subject to one or more conditional transmit power backoff metrics, such as a delta power class backoff that applies when one or more conditions are satisfied.

For example, the delta power class backoff may be applied to a UE in a particular power class to cap the MTPL of the UE when certain conditions are satisfied. For example, the delta power class backoff may have a value of 3 dBm for a UE having PC2 capabilities (e.g., supporting an MTPL of 26 dBm) when the network node indicates a maximum transmission power (P-max) of 23 dBm or lower, when the UE does not indicate a maximum uplink duty cycle and a percentage of uplink symbols transmitted in a certain evaluation period satisfies (e.g., exceeds) a threshold, such as 50%, or when the UE indicates a maximum uplink duty cycle and the percentage of uplink symbols transmitted in a certain evaluation period satisfies (e.g., exceeds) a maximum uplink duty cycle parameter. Otherwise, when the above conditions are not satisfied, the delta power class parameter is 0 dBm.

However, in some cases, a UE may support uplink MIMO transmission, where an uplink signal is transmitted using two or more Tx chains. In such cases, the UE may apply a per chain Tx power split across the various Tx chains, after any mandatory and conditional transmit power backoff metrics have been applied, which may result in a transmit power penalty with a margin that would be very useful in cell edge scenarios and/or other scenarios where a UE is attempting to maximize an uplink transmit power. For example, in cases where the per chain Tx power split is applicable, the available uplink transmit power is split across multiple Tx chains, which results in a reduction in the cumulative MTPL per chain (e.g., a 3 dBm difference). In such cases, there is a possibility that the conditional transmit power backoffs (e.g., the delta power class backoff) would not be applicable if the per chain Tx power split were applied before performing a check to determine whether the conditions associated with the conditional transmit power backoffs are satisfied. Accordingly, some aspects described herein relate to techniques to deduct one or more mandatory power backoffs and a per Tx chain power split from an initial MTPL value before checking whether one or more conditional power backoffs are applicable. In this way, in circumstances where the conditional power backoffs do not apply after the one or more mandatory power backoffs and the per Tx chain power split are applied to the initial MTPL value, the UE may transmit using a higher uplink Tx power, which may increase uplink throughput, increase uplink reliability, and/or increase a cell radius, among other examples.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components.

In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may apply a per chain transmit power split to a cumulative maximum transmit power level (MTPL); calculate a value associated with a conditional power backoff, wherein the value associated with the conditional power backoff is calculated after the per chain transmit power split is applied to the cumulative MTPL; and transmit, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff. Additionally, or alternatively, the communication manager 140 may perform one or more other operations described herein.

As indicated above, FIG. 1 is provided as an example. Other examples may differ from what is described with regard to FIG. 1.

Figure 2:
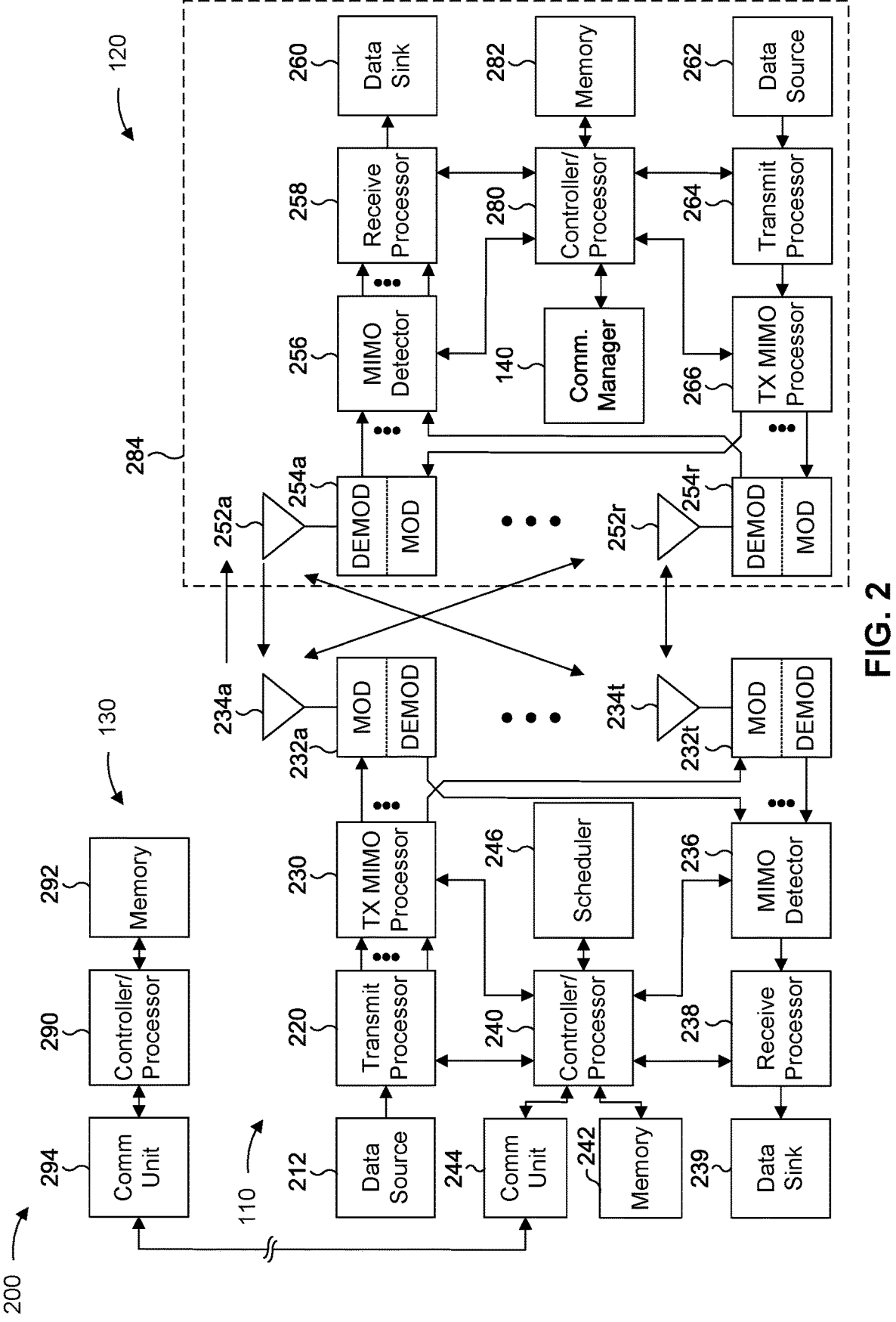
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., Tmodems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-6).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the ULE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-6).

The controller/processor 240 of the network node 110, the controller/processor 280 of the UE 120, and/or any other component(s) of FIG. 2 may perform one or more techniques associated with optimized handling for transmit power backoffs to enable uplink transmit power boost, as described in more detail elsewhere herein. For example, the controller/processor 240 of the network node 110, the controller/processor 280 of the UE 120, and/or any other component(s) of FIG. 2 may perform or direct operations of, for example, process 500 of FIG. 5 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 500 of FIG. 5 and/or other processes as described herein. In some examples, executing instructions may include running the instructions, converting the instructions, compiling the instructions, and/or interpreting the instructions, among other examples.

In some aspects, the UE 120 includes means for applying a per chain transmit power split to a cumulative MTPL;

means for calculating a value associated with a conditional power backoff, wherein the value associated with the conditional power backoff is calculated after the per chain transmit power split is applied to the cumulative MTPL; and/or means for transmitting, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
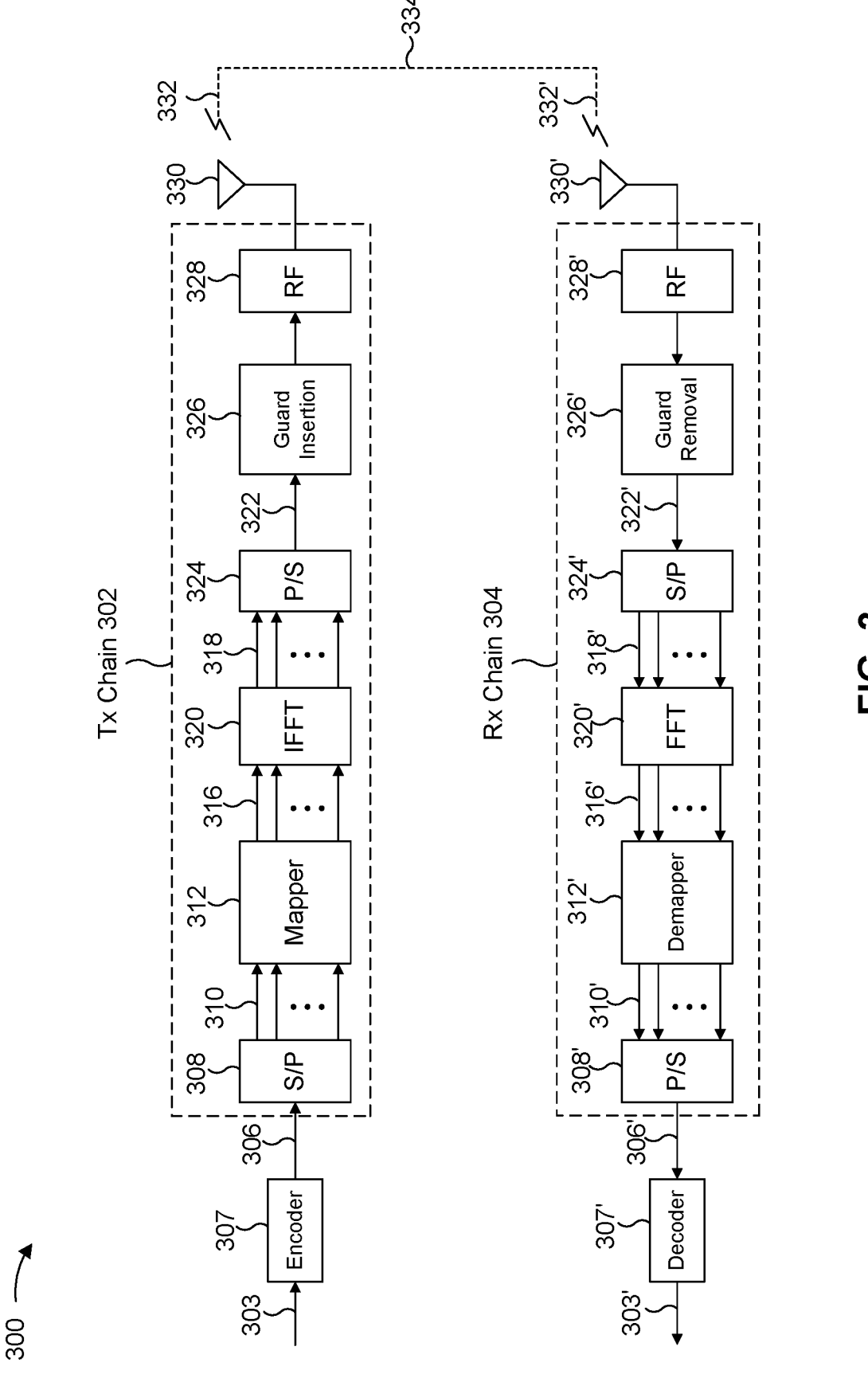
FIG. 3 is a diagram illustrating an example of a transmit (Tx) chain and a receive (Rx) chain of a UE, in accordance with the present disclosure.

FIG. 3 is a diagram illustrating an example 300 of a transmit (Tx) chain 302 and a receive (Rx) chain 304 of a UE 120, in accordance with the present disclosure. In some aspects, one or more components of Tx chain 302 may be implemented in transmit processor 264, TX MIMO processor 266, modem 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to a network node 110 on an uplink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), and/or quadrature amplitude modulation (QAM), among other examples. Thus, mapper 312 may output N parallel symbol streams 316, each symbol stream 316 corresponding to one of N orthogonal subcarriers of an inverse fast Fourier transform (IFFT) component 320. The N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, modem 254, and/or controller/processor 280, as described above in connection with FIG. 2. In some aspects, Rx chain 304 may be implemented in UE 120 for receiving data 306 (e.g., downlink data, a downlink reference signal, and/or downlink control information) from a network node 110 on a downlink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

FIG. 4 is a diagram illustrating an example associated with optimized handling for transmit power backoffs to enable uplink transmit power boost, in accordance with the present disclosure. As shown in FIG. 4, example 400 includes communication between a network node 110 and a UE 120. In some aspects, the UE 120 and the network node 110 may communicate in a wireless network, such as wireless network 100. The network node 110 and the UE 120 may communicate via a wireless access link, which may include an uplink and a downlink.

In a wireless network, a link budget between a UE 120 and a network node 110 is typically limited by an uplink due to a relatively low transmit power by a UE 120, which defines a limit on a cell range. For example, when a UE 120 transmits using a high transmit power, the UE 120 can communicate with a network node 110 from a longer distance. Similarly, when a UE 120 transmits using a relatively lower transmit power, a cell radius associated with the network node 110 may decrease. Accordingly, in some cases, a UE 120 may be associated with a UE power class that defines a maximum transmit power level (MTPL) that a UE 120 can use over a channel bandwidth. For example, in FR1, a UE 120 may be associated with power class 3 (PC3), which is applicable to all FR1 frequency bands and specified an MTPL of 23 decibel-milliwatts (dBm), or with power class 2 (PC2), which applies to specific operating bands (e.g., n41, n77, n78, or n79) and specifies a higher MTPL of 26 dBm. Additionally, or alternatively, there are four UE power classes defined for FR2, with each UE power class being associated with an intended use case or application. For example, in FR2, power class 1 (PC1) specifies an MTPL of 35 dBm for fixed wireless access (FWA) UEs that are used to provide broadband access in residential or office settings, and power classes 2 through 4 (PC2) specify an MTPL of 23 dBm for vehicular UEs, handheld UEs, and/or high-power non-handheld UEs. Furthermore, in FR2, the different power classes may be associated with different effective isotropic radiated power (EIRP) parameters, including maximum EIRP values to satisfy regulatory requirements (e.g., ensuring that devices do not transmit with high power that could cause health issues or generate excessive interference) and minimum peak EIRP values to ensure that UE transmissions generate a minimum output power in a given direction.

Accordingly, in some aspects, a UE 120 may be associated with a power class based on one or more capabilities or attributes of the UE 120, such as a maximum transmit power to be used by the UE 120 for one or more uplink transmissions. Example power classes include PC1 for a high power UE 120 with an MTPL of 35 dBm, PC2 for a UE 120 with an MTPL of 26 dBm, PC3 for a UE 120 with an MTPL of 23 dBm, or the like. In some cases, the UE 120 may have a fixed power class that does not change, and the UE 120 may indicate (e.g., report) the fixed power class to a network node 110 every time that the UE 120 registers with a wireless network. Additionally, or alternatively, conditions associated with the UE 120 may change over time, whereby the UE 120 may use different power classes in different circumstances depending on the varying conditions. Furthermore, in various circumstances, the UE 120 may be subject to one or more transmit power backoff metrics that reduce the cumulative MTPL that a UE 120 can use when transmitting an uplink signal. For example, the UE 120 may be subject to one or more mandatory transmit backoff metrics, such as a maximum power reduction (MPR) that may depend on a resource block (RB) allocation or an MCS associated with the UE 120 (e.g., to prevent interference with other UEs 120) and/or an additional MPR (A-MPR) (e.g., to satisfy maximum permissible exposure (MPE) constraints, other regulatory requirements related to a maximum EIRP, or the like). Additionally, or alternatively, the UE 120 may be subject to one or more conditional transmit power backoff metrics, such as a delta power class backoff that applies when one or more conditions are satisfied.

For example, the delta power class backoff may be applied to a UE 120 in a particular power class to cap the MTPL of the UE 120 when certain conditions are satisfied. For example, the delta power class backoff may have a value of 3 dBm for a UE 120 having PC2 capabilities (e.g., supporting an MTPL of 26 dBm) when the network node 110 indicates a maximum transmission power (P-max) of 23 dBm or lower, when the UE 120 does not indicate a maximum uplink duty cycle and a percentage of uplink symbols transmitted in a certain evaluation period satisfies (e.g., exceeds) a threshold, such as 50%, or when the UE 120 indicates a maximum uplink duty cycle and the percentage of uplink symbols transmitted in a certain evaluation period satisfies (e.g., exceeds) a maximum uplink duty cycle parameter. Otherwise, when the above conditions are not satisfied, the delta power class parameter is 0 dBm.

However, in some cases, a UE 120 may support uplink MIMO transmission, where an uplink signal is transmitted using two or more Tx chains. In such cases, the UE 120 may apply a per chain Tx power split across the various Tx chains, after any mandatory and conditional transmit power backoff metrics have been applied, which may result in a transmit power penalty with a margin that would be very useful in cell edge scenarios and/or other scenarios where a UE 120 is attempting to maximize an uplink transmit power. For example, in cases where the per chain Tx power split is applicable, the available uplink transmit power is split across multiple Tx chains, which results in a reduction in the cumulative MTPL per chain (e.g., a 3 dBm difference). In such cases, there is a possibility that the conditional transmit power backoffs (e.g., the delta power class backoff) would not be applicable if the per chain Tx power split were applied before performing a check to determine whether the conditions associated with the conditional transmit power back-offs are satisfied.

For example, referring to FIG. 4, reference number 410 depicts a transmit power calculation for a UE 120 that is transmitting an uplink signal in an FR1 band (e.g., the n78 band) using multiple transmit chains with a QPSK modulation and an inner RB allocation, which is associated with an MPR value of 1.5 dBm. In such cases, the MTPL may be defined as 26 dBm for a UE 120 with PC2 capabilities (e.g., based on the n78 band being associated with PC2), before any mandatory transmit power backoffs, conditional transmit power backoffs, and/or per Tx chain power splits are applied. As further shown, the RB allocation and MCS may be associated with a particular MPR value, such as 1.5 dBm for an inner RB allocation and QPSK modulation. Accordingly, the MPR value may represent a mandatory transmit power backoff that the UE 120 has to apply to prevent interference with other UEs 120, which is applied to the MTPL of 26 dBm to result in a cumulative MTPL of 24.5 dBm. As further shown, in existing implementations, the UE 120 performs a check after applying the mandatory transmit power backoffs to determine whether one or more conditional transmit power backoffs are applicable. In this case, the UE 120 may be subject to a delta power class backoff due to an uplink duty cycle satisfying a threshold (e.g., exceeding the threshold, such as 50% of the uplink symbols in a certain evaluation period). In general, the delta power class backoff may cap the maximum transmit power available to the UE 120 to a next lower power class, such as PC3 in the case of a UE 120 with PC2 capabilities. For example, if PC3 is associated with an MTPL of 23 dBm and the cumulative MTPL of a UE 120 associated with PC2 exceeds 23 dBm, the cumulative MTPL of the UE 120 associated with PC2 may be reduced to 23 dBm if the applicable conditions are satisfied (e.g., the uplink duty cycle satisfies the applicable threshold(s)). In the example illustrated by reference number 410, the cumulative MTPL is 24.5 dBm when the check for the delta power class backoff is performed, which results in the cumulative MTPL being reduced to 23 dBm. When the per chain Tx power split is subsequently applied, the cumulative MTPL is further reduced another 3 dBm, resulting in a final transmit power of 20 dBm.

However, as mentioned above, the final transmit power may potentially be higher if the per chain Tx power split is subsequently applied before checking for whether the conditions associated with conditional transmit power backoffs are satisfied. For example, in FIG. 4, reference number 420 depicts a transmit power calculation in which the UE 120 applies a per chain Tx power split, after applying any mandatory transmit power backoff metrics and before performing a check to determine whether any conditional transmit power backoff metrics are applicable. In this case, the UE 120 is still transmitting the uplink signal in the FR1 band with the same uplink parameters (e.g., a QPSK modulation and an inner RB allocation), which is associated with an MPR value of 1.5 dBm. In such cases, the initial MTPL of 26 dBm is reduced to 24.5 dBm after the mandatory transmit power backoff(s) are applied, and the UE 120 then applies a per Tx chain power split to the cumulative MTPL. For example, as shown, the per chain Tx power split is associated with a power reduction of 3 dBm, which results in a cumulative MTPL of 21.5 dBm. In some aspects, the UE 120 then performs the check to determine whether the conditional transmit power backoff metrics are applicable. For example, in this case, the cumulative MTPL value fails to satisfy (e.g., does not exceed) a threshold associated with the conditional transmit power backoff metrics, such as 23 dBm for a delta power class backoff associated with a UE 120 assigned to PC2 with an uplink duty cycle that satisfies (e.g., exceeds) a threshold, such as 50% of the uplink symbols in a certain evaluation period. In this case, by applying the per chain Tx power split before checking for the applicability of the conditional transmit power backoff, the final transmit power is 21.5 dBm, which is 1.5 dBm better than the case where the per chain Tx power split is applied after checking for the applicability of the conditional transmit power backoff and/or applying the conditional transmit power backoff if the appropriate conditions are met. Furthermore, the increase in the final transmit power does not create a risk of damaging power amplifiers or other transmission circuitry at the UE 120, even in higher uplink duty cycle scenarios, because the final transmit power is within the range associated with the conditional transmit power backoff metric (e.g., does not exceed 23 dBm).

Accordingly, as shown in FIG. 4, and by reference number 430, the network node 110 may transmit, and the UE 120 may receive, signaling that indicates an uplink configuration associated with one or more uplink signals to be transmitted by the UE 120. For example, the uplink configuration may specify an operating band in which the uplink signals are to be transmitted, an uplink bandwidth part associated with the operating band, a power class that defines an MTPL value for the UE 120, and/or one or more parameters that relate to one or more uplink signals to be transmitted by the UE 120. For example, in some aspects, the one or more parameters may include an RB allocation, an MCS, a transmit precoder matrix indicator (TPMI), and/or one or more other suitable parameters. In general, the TPMI may have a value that indicates whether the UE 120 is to transmit an uplink signal using one Tx chain or using multiple Tx chains. For example, in some aspects, the TPMI may have a value of 0 to indicate that the UE 120 is to transmit an uplink signal using a first Tx chain only, a value of 1 to indicate that the UE 120 is to transmit an uplink signal using a second Tx chain only, or a value of 2 to indicate that the UE 120 is to transmit an uplink signal using the first Tx chain and the second Tx chain. In the latter case, where the UE 120 is to transmit the uplink signal using the multiple Tx chains, the UE 120 may also apply a per chain Tx power split to a cumulative MTPL value, which may reduce the maximum transmit power for the uplink signal by a value that depends on the number of Tx chains. For example, the per chain Tx power split may have a value of 3 dBm when the total uplink transmit power is split across two Tx chains, or a higher value when the total uplink transmit power is split across a larger number of Tx chains (e.g., four Tx chains).

As further shown in FIG. 4, and by reference number 440, the UE 120 may then apply any mandatory transmit power backoff metrics that may be applicable to the uplink signal in addition to a per chain Tx power split in cases where the uplink configuration indicates an uplink MIMO configuration (e.g., multiple Tx chains). For example, in some aspects, the uplink configuration may indicate a power class associated with the UE 120, such as PC2 or PC3 in FR1, or PC1 through PC4 in FR2, where the power class may generally define an initial value for the cumulative MTPL. For example, PC2 in FR1, which is associated with specific operating bands, may be associated with an initial MTPL of 26 dBm, and PC3 in FR1 may be associated with an initial MTPL of 23 dBm. Accordingly, in some aspects, the UE 120 may determine one or more MPR, A-MPR, and/or other mandatory transmit power backoffs that are applicable to the UE 120, which may be applied to (e.g., deducted from) the (initial) cumulative MTPL value. For example, the MPR value may include a dBm value associated with a given modulation scheme, MCS, RB allocation, or the like, which is applied to the cumulative MTPL value to prevent interference with other UEs. Additionally, or alternatively, an A-MPR value may be applicable to the UE 120 to satisfy an MPE constraint or other applicable restrictions on uplink transmit power. Accordingly, the UE 120 may generally apply any mandatory transmit power backoffs that are applicable to the UE 120 to the cumulative MTPL value, and may then apply the per chain Tx power split to the cumulative MTPL value after any applicable mandatory transmit power backoffs have been applied. For example, in the case of a UE 120 configured to transmit using two Tx chains, the UE 120 may apply a per chain Tx power split of 3 dBm, which further reduces the cumulative MTPL value.

As further shown in FIG. 4, and by reference number 450, the UE 120 may then check to determine whether one or more conditional transmit power backoffs are applicable, after the per chain Tx power split (and any mandatory transmit power backoffs) are applied. For example, in some aspects, the one or more conditional transmit power backoffs may include a delta power class backoff that caps the MTPL value to a next lower power class when one or more conditions are satisfied (e.g., when a P-max parameter has a value of 23 dBm or lower, a percentage of uplink symbols transmitted in a certain evaluation period exceeds 50%, or when the percentage of uplink symbols transmitted in a certain evaluation period exceeds a maximum uplink duty cycle capability of the UE 120). In some aspects, when the conditions associated with the conditional transmit power backoff are satisfied, the conditional transmit power backoff may have a non-zero value that is applied to the cumulative MTPL to prevent damage to power amplifiers of the UE 120. For example, the non-zero value of the conditional transmit power backoff may be based on a difference between the cumulative MTPL value and the MTPL value of a next lower power class (e.g., if the MTPL value for the next lower power class is N dBm and the conditions associated with the conditional transmit power backoff are satisfied, the cumulative MTPL value may be reduced to N dBm). Otherwise, if the one or more conditions associated with the conditional transmit power backoff are not satisfied (e.g., the P-max parameter has a value greater than 23 dBm, the percentage of uplink symbols transmitted in a certain evaluation period exceeds 50%, the percentage of uplink symbols transmitted in a certain evaluation period exceeds the maximum uplink duty cycle capability of the UE 120, and/or the cumulative MTPL value exceeds the MTPL of the next lower power class), the conditional transmit power backoff may have a zero or null value.

In some aspects, as shown by reference number 460, the UE 120 may then transmit the uplink signal using a final transmit power that does not exceed the final transmit power calculation after application of the various transmit power reductions (e.g., the mandatory transmit power backoff(s), the per chain Tx power split, and the conditional transmit power backoff(s)). For example, the final Tx power calculation may represent the highest transmit power that the UE 120 can use to transmit the uplink signal, which may be a physical uplink control channel (PUCCH) or a physical uplink shared channel (PUSCH) transmission, whereby the uplink signal may be transmitted using a transmit power up to the final Tx power calculation. In this way, by applying the per chain Tx power split prior to checking for the applicability of the conditional transmit power backoffs, there is a possibility that the conditional transmit power backoffs may not apply (e.g., may be excluded from the final Tx power calculation), which may provide a boost in uplink transmit power to increase uplink reliability, uplink throughput, and/or a cell radius when the UE 120 is located in a cell edge region.

As indicated above, FIG. 4 is provided as an example. Other examples may differ from what is described with regard to FIG. 4.

FIG. 5 is a diagram illustrating an example process 500 performed, for example, by a UE, in accordance with the present disclosure. Example process 500 is an example where the UE (e.g., UE 120) performs operations associated with optimized handling for transmit power backoffs to enable an uplink transmit power boost.

As shown in FIG. 5, in some aspects, process 500 may include applying a per chain transmit power split to a cumulative MTPL (block 510). For example, the UE (e.g., using communication manager 606, depicted in FIG. 6) may apply a per chain transmit power split to a cumulative MTPL, as described above.

As further shown in FIG. 5, in some aspects, process 500 may include calculating a value associated with a conditional power backoff, wherein the value associated with the conditional power backoff is calculated after the per chain transmit power split is applied to the cumulative MTPL (block 520). For example, the UE (e.g., using communication manager 606, depicted in FIG. 6) may calculate a value associated with a conditional power backoff, wherein the value associated with the conditional power backoff is calculated after the per chain transmit power split is applied to the cumulative MTPL, as described above.

As further shown in FIG. 5, in some aspects, process 500 may include transmitting, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff (block 530). For example, the UE (e.g., using transmission component 604 and/or communication manager 606, depicted in FIG. 6) may transmit, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff, as described above.

Process 500 may include additional aspects, such as any single aspect or any combination of aspects described below and/or in connection with one or more other processes described elsewhere herein.

In a first aspect, the conditional power backoff has a zero or null value based on the cumulative MTPL satisfying a threshold associated with the conditional power backoff after the per chain transmit power split is applied to the cumulative MTPL.

In a second aspect, alone or in combination with the first aspect, the conditional power backoff has a non-zero value that is applied to the cumulative MTPL based on the cumulative MTPL failing to satisfy a threshold associated with the conditional power backoff after the per chain transmit power split is applied to the cumulative MTPL.

In a third aspect, alone or in combination with one or more of the first and second aspects, process 500 includes applying a mandatory transmit backoff to the cumulative MTPL prior to calculating the value associated with the conditional power backoff, wherein the final transmit power level is further based on the value of the cumulative MTPL after the mandatory transmit backoff is applied to the cumulative MTPL.

In a fourth aspect, alone or in combination with one or more of the first through third aspects, the conditional power backoff has a zero or null value based on the cumulative MTPL satisfying a threshold associated with the conditional power backoff after the per chain transmit power split and the mandatory transmit power backoff are applied to the cumulative MTPL.

In a fifth aspect, alone or in combination with one or more of the first through fourth aspects, the conditional power backoff has a non-zero value applied to the cumulative MTPL based on the cumulative MTPL failing to satisfy a threshold associated with the conditional power backoff after the per chain transmit power split and the mandatory transmit power backoff are applied to the cumulative MTPL.

In a sixth aspect, alone or in combination with one or more of the first through fifth aspects, the mandatory transmit power backoff includes one or more of an MPR or an A-MPR.

In a seventh aspect, alone or in combination with one or more of the first through sixth aspects, the conditional power backoff is a delta power class backoff that is applicable to the uplink signal.

In an eighth aspect, alone or in combination with one or more of the first through seventh aspects, a value of the per chain transmit power split is based on a number of the multiple transmit chains used to transmit the uplink signal.

In a ninth aspect, alone or in combination with one or more of the first through eighth aspects, an initial value of the cumulative MTPL is based on a power class associated with a band used to transmit the uplink signal.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
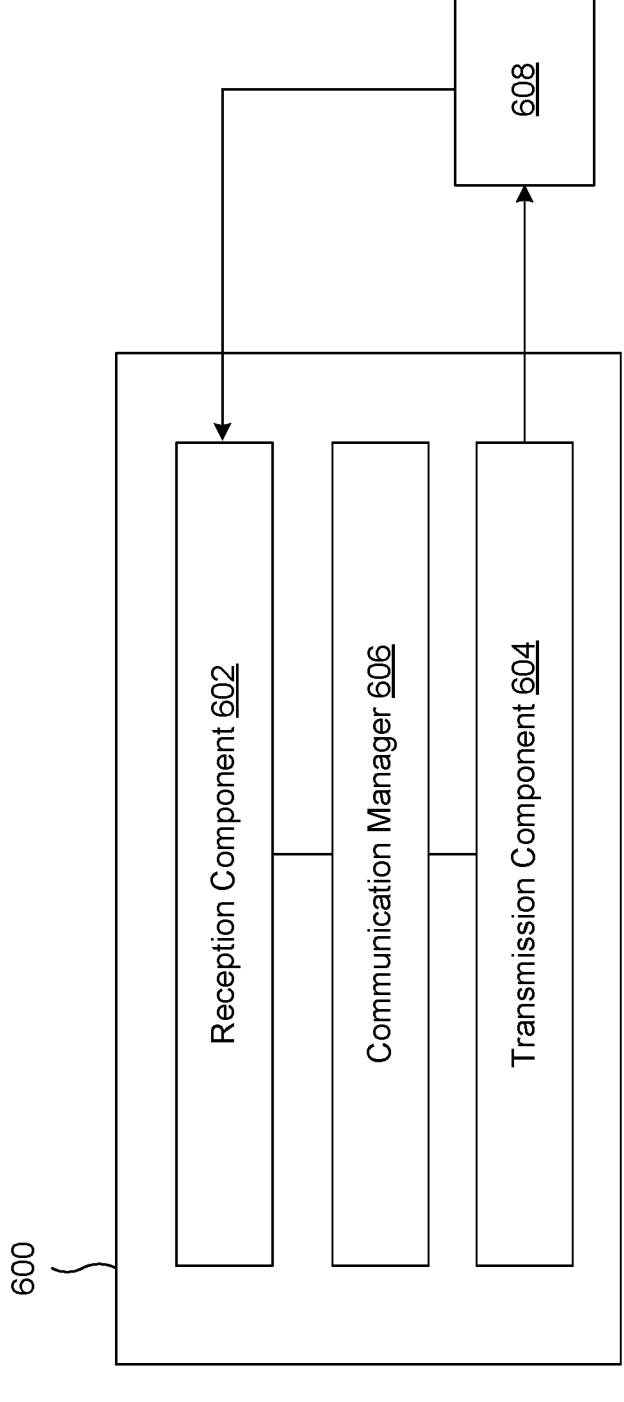
FIG. 6 is a diagram of an example apparatus for wireless communication, in accordance with the present disclosure.

FIG. 6 is a diagram of an example apparatus 600 for wireless communication, in accordance with the present disclosure. The apparatus 600 may be a UE, or a UE may include the apparatus 600. In some aspects, the apparatus 600 includes a reception component 602, a transmission component 604, and/or a communication manager 606, which may be in communication with one another (for example, via one or more buses and/or one or more other components). In some aspects, the communication manager 606 is the communication manager 140 described in connection with FIG. 1. As shown, the apparatus 600 may communicate with another apparatus 608, such as a UE or a network node (such as a CU, a DU, an RU, or a base station), using the reception component 602 and the transmission component 604.

In some aspects, the apparatus 600 may be configured to perform one or more operations described herein in connection with FIG. 4. Additionally, or alternatively, the apparatus 600 may be configured to perform one or more processes described herein, such as process 500 of FIG. 5. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 608. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 608. In some aspects, one or more other components of the apparatus 600 may generate communications and may provide the generated communications to the transmission component 604 for transmission to the apparatus 608. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 608. In some aspects, the transmission component 604 may include one or more antennas, a modem, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The communication manager 606 may support operations of the reception component 602 and/or the transmission component 604. For example, the communication manager 606 may receive information associated with configuring reception of communications by the reception component 602 and/or transmission of communications by the transmission component 604. Additionally, or alternatively, the communication manager 606 may generate and/or provide control information to the reception component 602 and/or the transmission component 604 to control reception and/or transmission of communications.

The communication manager 606 may apply a per chain transmit power split to a cumulative MTPL. The communication manager 606 may calculate a value associated with a conditional power backoff, wherein the value associated with the conditional power backoff is calculated after the per chain transmit power split is applied to the cumulative MTPL. The transmission component 604 may transmit, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff.

The communication manager 606 may apply a mandatory transmit backoff to the cumulative MTPL prior to calculating the value associated with the conditional power backoff, wherein the final transmit power level is further based on the value of the cumulative MTPL after the mandatory transmit backoff is applied to the cumulative MTPL.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a UE, comprising: applying a per chain transmit power split to a cumulative MTPL; calculating a value associated with a conditional power backoff, wherein the value associated with the conditional power backoff is calculated after the per chain transmit power split is applied to the cumulative MTPL; and transmitting, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff.

Aspect 2: The method of Aspect 1, wherein the conditional power backoff has a zero or null value based on the cumulative MTPL satisfying a threshold associated with the conditional power backoff after the per chain transmit power split is applied to the cumulative MTPL.

Aspect 3: The method of any of Aspects 1-2, wherein the conditional power backoff has a non-zero value that is applied to the cumulative MTPL based on the cumulative MTPL failing to satisfy a threshold associated with the conditional power backoff after the per chain transmit power split is applied to the cumulative MTPL.

Aspect 4: The method of any of Aspects 1-3, further comprising: applying a mandatory transmit backoff to the cumulative MTPL prior to calculating the value associated with the conditional power backoff, wherein the final transmit power level is further based on the value of the cumulative MTPL after the mandatory transmit backoff is applied to the cumulative MTPL.

Aspect 5: The method of Aspect 4, wherein the conditional power backoff has a zero or null value based on the cumulative MTPL satisfying a threshold associated with the conditional power backoff after the per chain transmit power split and the mandatory transmit power backoff are applied to the cumulative MTPL.

Aspect 6: The method of Aspect 4, wherein the conditional power backoff has a non-zero value applied to the cumulative MTPL based on the cumulative MTPL failing to satisfy a threshold associated with the conditional power backoff after the per chain transmit power split and the mandatory transmit power backoff are applied to the cumulative MTPL.

Aspect 7: The method of Aspect 4, wherein the mandatory transmit power backoff includes one or more of an MPR or an A-MPR.

Aspect 8: The method of any of Aspects 1-7, wherein the conditional power backoff is a delta power class backoff that is applicable to the uplink signal.

Aspect 9: The method of any of Aspects 1-8, wherein a value of the per chain transmit power split is based on a number of the multiple transmit chains used to transmit the uplink signal.

Aspect 10: The method of any of Aspects 1-9, wherein an initial value of the cumulative MTPL is based on a power class associated with a band used to transmit the uplink signal.

Aspect 11: An apparatus for wireless communication at a device, comprising a processor; memory coupled with the processor; and instructions stored in the memory and executable by the processor to cause the apparatus to perform the method of one or more of Aspects 1-10.

Aspect 12: A device for wireless communication, comprising a memory and one or more processors coupled to the memory, the one or more processors configured to perform the method of one or more of Aspects 1-10.

Aspect 13: An apparatus for wireless communication, comprising at least one means for performing the method of one or more of Aspects 1-10.

Aspect 14: A non-transitory computer-readable medium storing code for wireless communication, the code comprising instructions executable by a processor to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

applying a per chain transmit power split to a cumulative maximum transmit power level (MTPL);

calculating a value associated with a conditional power backoff, wherein the value associated with the conditional power backoff is calculated after the per chain transmit power split is applied to the cumulative MTPL, and wherein the conditional power backoff has a non-zero value that is applied to the cumulative MTPL based on the cumulative MTPL failing to satisfy a threshold associated with the conditional power backoff after the per chain transmit power split is applied to the cumulative MTPL; and transmitting, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff.

2. The method of claim 1, further comprising:

applying a mandatory transmit backoff to the cumulative MTPL prior to calculating the value associated with the conditional power backoff, wherein the final transmit power level is further based on the value of the cumulative MTPL after the mandatory transmit backoff is applied to the cumulative MTPL.

3. The method of claim 2, wherein the conditional power backoff has a zero or null value based on the cumulative MTPL satisfying a threshold associated with the conditional power backoff after the per chain transmit power split and the mandatory transmit power backoff are applied to the cumulative MTPL.

4. The method of claim 2, wherein the conditional power backoff has a non-zero value applied to the cumulative MTPL based on the cumulative MTPL failing to satisfy a threshold associated with the conditional power backoff after the per chain transmit power split and the mandatory transmit power backoff are applied to the cumulative MTPL.

5. The method of claim 2, wherein the mandatory transmit power backoff includes one or more of a maximum power reduction (MPR) or an additional MPR (A-MPR).

6. The method of claim 1, wherein the conditional power backoff is a delta power class backoff that is applicable to the uplink signal.

7. The method of claim 1, wherein a value of the per chain transmit power split is based on a number of the multiple transmit chains used to transmit the uplink signal.

8. The method of claim 1, wherein an initial value of the cumulative MTPL is based on a power class associated with a band used to transmit the uplink signal.

9. A user equipment (UE) for wireless communication, comprising:

a memory; and one or more processors, coupled to the memory, configured to:

apply a per chain transmit power split to a cumulative maximum transmit power level (MTPL);

calculate a value associated with a conditional power backoff, wherein the value associated with the conditional power backoff is calculated after the per chain transmit power split is applied to the cumulative MTPL, and wherein the conditional power backoff has a non-zero value that is applied to the cumulative MTPL based on the cumulative MTPL failing to satisfy a threshold associated with the conditional power backoff after the per chain transmit power split is applied to the cumulative MTPL; and transmit, using multiple transmit chains, an uplink signal using a final transmit power level, wherein the final transmit power level is based on a value of the cumulative MTPL after the per chain transmit power split is applied to the cumulative MTPL and the calculated value associated with the conditional power backoff.

10. The UE of claim 9, wherein the one or more processors are further configured to:

apply a mandatory transmit backoff to the cumulative MTPL prior to calculating the value associated with the conditional power backoff, wherein the final transmit power level is further based on the value of the cumulative MTPL after the mandatory transmit backoff is applied to the cumulative MTPL.

11. The UE of claim 10, wherein the conditional power backoff has a zero or null value based on the cumulative MTPL satisfying a threshold associated with the conditional power backoff after the per chain transmit power split and the mandatory transmit power backoff are applied to the cumulative MTPL.

12. The UE of claim 10, wherein the conditional power backoff has a non-zero value applied to the cumulative MTPL based on the cumulative MTPL failing to satisfy a threshold associated with the conditional power backoff after the per chain transmit power split and the mandatory transmit power backoff are applied to the cumulative MTPL.

13. The UE of claim 10, wherein the mandatory transmit power backoff includes one or more of a maximum power reduction (MPR) or an additional MPR (A-MPR).

14. The UE of claim 9, wherein the conditional power backoff is a delta power class backoff that is applicable to the uplink signal.

15. The UE of claim 9, wherein a value of the per chain transmit power split is based on a number of the multiple transmit chains used to transmit the uplink signal.

16. The UE of claim 9, wherein an initial value of the cumulative MTPL is based on a power class associated with a band used to transmit the uplink signal.

17. A method of wireless communication performed by a user equipment (UE), comprising:

applying a per chain transmit power split to a cumulative maximum transmit power level (MTPL);

applying a mandatory transmit backoff to the cumulative MTPL prior to calculating a value associated with a conditional power backoff;

calculating the value associated with the conditional power backoff, wherein the value associated with the conditional power backoff is calculated after the per chain transmit power split is applied to the cumulative MTPL; and transmitting, using multiple transmit chains, an uplink signal using a final transmit power level, wherein the final transmit power level is based on a value of the cumulative MTPL after the per chain transmit power split is applied to the cumulative MTPL, the value of the cumulative MTPL after the mandatory transmit backoff is applied to the cumulative MTPL, and the calculated value associated with the conditional power backoff.

18. The method of claim 17, wherein the conditional power backoff has a zero or null value based on the cumulative MTPL satisfying a threshold associated with the conditional power backoff after the per chain transmit power split and the mandatory transmit power backoff are applied to the cumulative MTPL.

19. The method of claim 17, wherein the conditional power backoff has a non-zero value applied to the cumulative MTPL based on the cumulative MTPL failing to satisfy a threshold associated with the conditional power backoff after the per chain transmit power split and the mandatory transmit power backoff are applied to the cumulative MTPL.

20. The method of claim 17, wherein the mandatory transmit power backoff includes one or more of a maximum power reduction (MPR) or an additional MPR (A-MPR).

21. The method of claim 17, wherein the conditional power backoff is a delta power class backoff that is applicable to the uplink signal.

22. The method of claim 17, wherein a value of the per chain transmit power split is based on a number of the multiple transmit chains used to transmit the uplink signal.

23. The method of claim 17, wherein an initial value of the cumulative MTPL is based on a power class associated with a band used to transmit the uplink signal.

24. A user equipment (UE) for wireless communication, comprising:

a memory; and one or more processors, coupled to the memory, configured to:

apply a per chain transmit power split to a cumulative maximum transmit power level (MTPL);

apply a mandatory transmit backoff to the cumulative MTPL prior to calculating a value associated with a conditional power backoff;

calculate the value associated with the conditional power backoff, wherein the value associated with the conditional power backoff is calculated after the per chain transmit power split is applied to the cumulative MTPL; and transmit, using multiple transmit chains, an uplink signal using a final transmit power level, wherein the final transmit power level is based on a value of the cumulative MTPL after the per chain transmit power split is applied to the cumulative MTPL, the value of the cumulative MTPL after the mandatory transmit backoff is applied to the cumulative MTPL, and the calculated value associated with the conditional power backoff.

25. The UE of claim 24, wherein the conditional power backoff has a zero or null value based on the cumulative MTPL satisfying a threshold associated with the conditional power backoff after the per chain transmit power split and the mandatory transmit power backoff are applied to the cumulative MTPL.

26. The UE of claim 24, wherein the conditional power backoff has a non-zero value applied to the cumulative MTPL based on the cumulative MTPL failing to satisfy a threshold associated with the conditional power backoff after the per chain transmit power split and the mandatory transmit power backoff are applied to the cumulative MTPL.

27. The UE of claim 24, wherein the mandatory transmit power backoff includes one or more of a maximum power reduction (MPR) or an additional MPR (A-MPR).

28. The UE of claim 24, wherein the conditional power backoff is a delta power class backoff that is applicable to the uplink signal.

29. The UE of claim 24, wherein a value of the per chain transmit power split is based on a number of the multiple transmit chains used to transmit the uplink signal.

30. The UE of claim 24, wherein an initial value of the cumulative MTPL is based on a power class associated with a band used to transmit the uplink signal.

* * * * *